US007957087B2

(12) United States Patent  (10) Patent No.: US 7,957,087 B2
Nishimoto et al.  (45) Date of Patent: Jun. 7, 2011

(54) SERVO WRITE METHOD AND SERVO WRITE SYSTEM FOR HARD-DISK DRIVE

(75) Inventors: Yasunori Nishimoto, Kanagawa (JP); Yoshiteru Katsumura, Kanagawa (JP); Hiroshi Fukuyama, Kanagawa (JP); Naoki Shimamura, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/630,548

(22) Filed: Dec. 3, 2009

(65) Prior Publication Data

US 2010/0134918 A1   Jun. 3, 2010

(30) Foreign Application Priority Data

Dec. 3, 2008  (JP) ................................ 2008-308842

(51) Int. Cl.
*G11B 15/18* (2006.01)
*G11B 21/02* (2006.01)

(52) U.S. Cl. ............................................ 360/69; 360/75
(58) Field of Classification Search ........................ None
See application file for complete search history.

(56) References Cited

U.S. PATENT DOCUMENTS 5,485,322 A      1/1996  Chainer et al.
2005/0043978 A1*  2/2005  Chainer et al. .................... 705/7

FOREIGN PATENT DOCUMENTS

JP         2006260682         9/2006

* cited by examiner

*Primary Examiner* — K. Wong

(57) ABSTRACT

A servo write method for a hard-disk drive. The method includes generating, with an input of characteristics of a magnetic-recording head and a magnetic-recording disk which are incorporated into the hard-disk drive, a yield prediction model from a correlation between yields of the hard-disk drive, and characteristics of the magnetic-recording head and the magnetic-recording disk of the hard-disk drive in a process. The method also includes predicting a yield which is obtained when each magnetic-recording head is used as a position control head, selecting as the position control head a magnetic-recording head that has a highest predicted yield, and writing a servo signal.

8 Claims, 20 Drawing Sheets

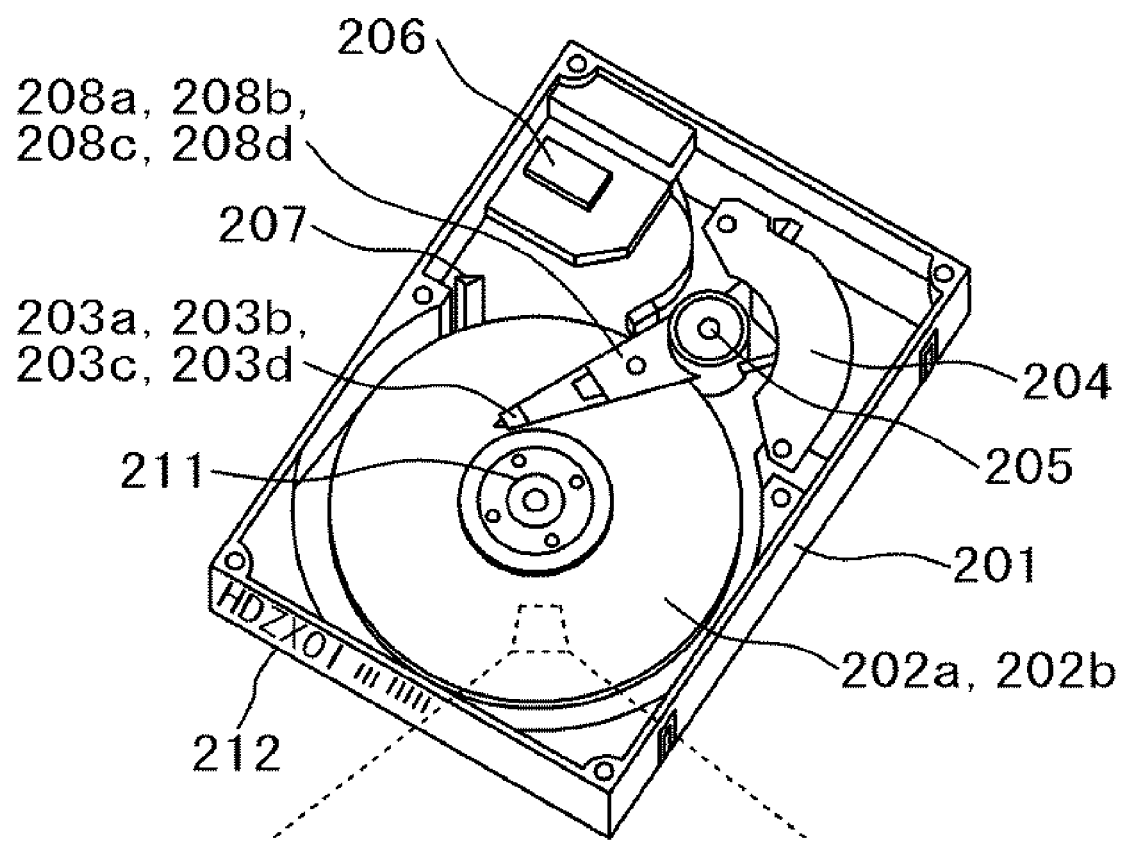
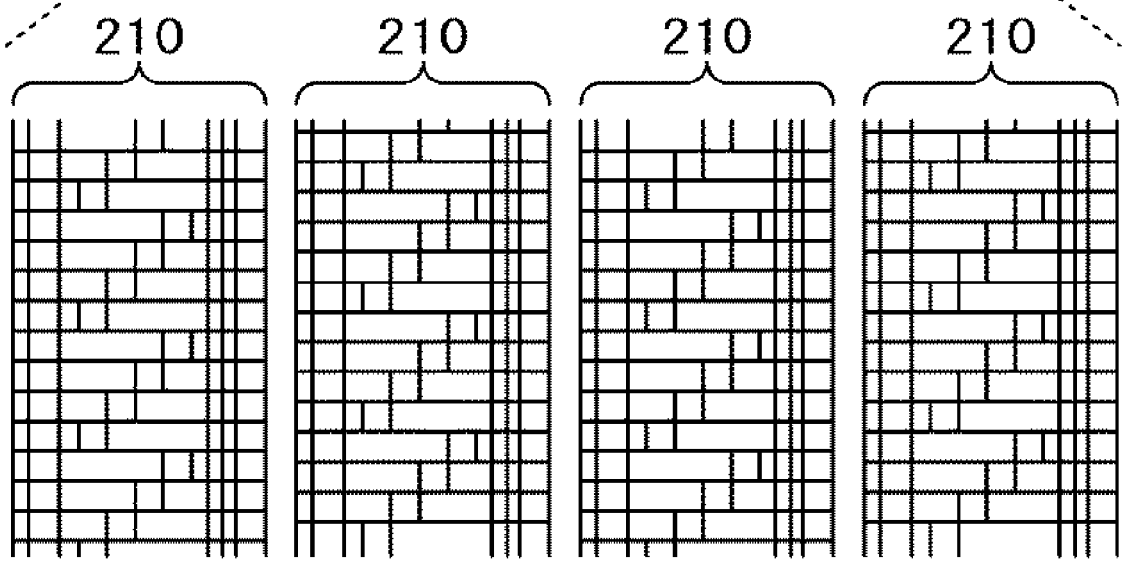
FIG. 2

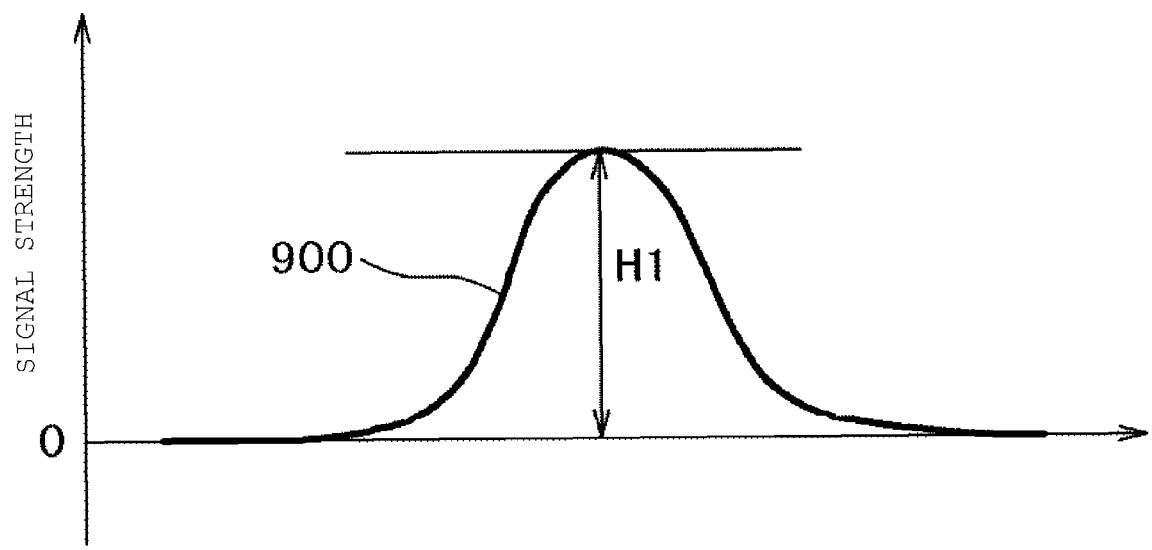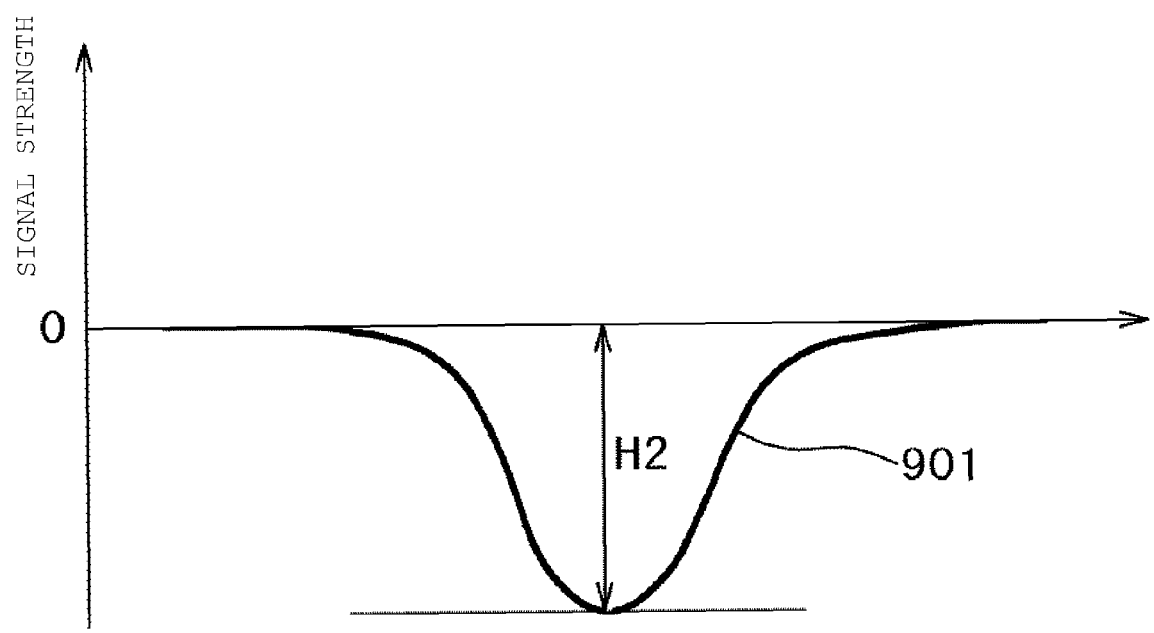
FIG. 9

1000

| PRODUCT NUMBER | MAGNETIC RECORDING APPARATUS SERIAL NUMBER | HEAD 1 SERIAL NUMBER | HEAD 2 SERIAL NUMBER | HEAD 3 SERIAL NUMBER | HEAD 4 SERIAL NUMBER |
|---|---|---|---|---|---|
| HDXZ | HDXZ001 | TMRA01 | TMRB02 | TMRA03 | TMRB04 |
| HDXZ | HDXZ002 | TMRB05 | TMRA04 | TMRC06 | TMRA12 |
| ... | ... | ... | ... | ... | ... |
| HDAF | HDAF005 | TMRB08 | TMRC09 | TMRA07 | TMRC19 |

1001

| PRODUCT NUMBER | MAGNETIC RECORDING APPARATUS SERIAL NUMBER | DISK 1 SERIAL NUMBER | DISK 2 SERIAL NUMBER | DISK 3 SERIAL NUMBER | DISK 4 SERIAL NUMBER |
|---|---|---|---|---|---|
| HDXZ | HDXZ001 | DKG123U | DKG123D | DKG456U | DKG456D |
| HDXZ | HDXZ002 | DKG124U | DKG124D | DKH578U | DKG124D |
| ... | ... | ... | ... | ... | ... |
| HDAF | HDAF005 | DKG125U | DKG125D | DKG944U | DKG125D |

| HEAD SERIAL NUMBER | REPRODUCTION WIDTH (nm) | RECORDING WIDTH (nm) | OVERWRITE STRENGTH | ADJACENT TRACK INFLUENCE QUANTITY | SIGNAL AMPLITUDE (mV) | ... | PART NUMBER |
|---|---|---|---|---|---|---|---|
| TMRA01 | 0.66 | 0.657 | 0.85 | 0.74 | 2.1 | ... | TMR-A |
| TMRB02 | 0.54 | 0.547 | 0.83 | 0.65 | 2.3 | ... | TMR-B |
| TMRA03 | 0.58 | 0.593 | 0.84 | 0.69 | 2.2 | ... | TMR-A |
| TMRB04 | 0.72 | 0.669 | 0.82 | 0.75 | 2.3 | ... | TMR-B |
| ... | ... | ... | ... | ... | ... | ... | ... |
| TMRSA1 | 0.32 | 0.268 | 0.77 | 0.34 | 3.1 | ... | TMR-S |

1101

| DISK SERIAL NUMBER | MAGNETIC FILM THICKNESS (nm) | PROTECTIVE FILM THICKNESS (nm) | COERCIVITY (A/m) | ... | PART NUMBER |
|---|---|---|---|---|---|
| DKG123U | 0.22 | 0.12 | 1.22 | ... | DK-G-U |
| DKG123D | 0.35 | 0.13 | 1.45 | ... | DK-G-D |
| DKG456U | 0.37 | 0.17 | 1.37 | ... | DK-G-U |
| DKG456D | 0.25 | 0.21 | 1.21 | ... | DK-G-D |
| ... | ... | ... | ... | ... | ... |
| DKJ852U | 0.21 | 0.16 | 1.98 | ... | DK-J-U |

FIG. 11

| PRODUCT NUMBER | PART NAME | CHARACTERISTIC NAME | VALUE 1 | VALUE 2 | SELF-SERVO WRITE YIELD |
|---|---|---|---|---|---|
| HDXZ | HEAD | REPRODUCTION WIDTH | 0 | 0.1 | 0.61 |
| HDXZ | HEAD | REPRODUCTION WIDTH | 0.1 | 0.2 | 0.68 |
| HDXZ | HEAD | REPRODUCTION WIDTH | 0.2 | 0.3 | 0.74 |
| HDXZ | HEAD | REPRODUCTION WIDTH | 0.3 | 0.4 | 0.78 |
| HDXZ | HEAD | REPRODUCTION WIDTH | 0.4 | 0.5 | 0.79 |
| HDXZ | HEAD | REPRODUCTION WIDTH | 0.5 | 0.6 | 0.83 |
| HDXZ | HEAD | REPRODUCTION WIDTH | 0.6 | 0.7 | 0.81 |
| HDXZ | HEAD | REPRODUCTION WIDTH | 0.7 | 0.8 | 0.68 |
| ... | ... | ... | ... | ... | ... |
| HDXZ | HEAD | RECORDING WIDTH | 0.5 | 0.6 | 0.69 |
| HDXZ | HEAD | RECORDING WIDTH | 0.6 | 0.7 | 0.67 |
| ... | ... | ... | ... | ... | ... |
| HDXZ | HEAD | OVERWRITE STRENGTH | 0.82 | 0.84 | 0.62 |
| HDXZ | HEAD | OVERWRITE STRENGTH | 0.84 | 0.86 | 0.69 |
| ... | ... | ... | ... | ... | ... |
| HDXZ | HEAD | ADJACENT TRACK INFLUENCE QUANTITY | 0.6 | 0.7 | 0.84 |
| HDXZ | HEAD | ADJACENT TRACK INFLUENCE QUANTITY | 0.7 | 0.8 | 0.81 |
| ... | ... | ... | ... | ... | ... |
| HDXZ | HEAD | SIGNAL AMPLITUDE | 2 | 2.2 | 0.83 |
| HDXZ | HEAD | SIGNAL AMPLITUDE | 2.2 | 2.4 | 0.86 |
| ... | ... | ... | ... | ... | ... |
| HDXZ | DISK | MAGNETIC FILM THICKNESS | 0.2 | 0.3 | 0.74 |
| HDXZ | DISK | MAGNETIC FILM THICKNESS | 0.3 | 0.4 | 0.78 |
| ... | ... | ... | ... | ... | ... |
| HDXZ | DISK | PROTECTIVE FILM THICKNESS | 0.1 | 0.2 | 0.83 |
| HDXZ | DISK | PROTECTIVE FILM THICKNESS | 0.2 | 0.3 | 0.81 |
| ... | ... | ... | ... | ... | ... |
| HDXZ | DISK | COERCIVITY | 1 | 1.25 | 0.83 |
| HDXZ | DISK | COERCIVITY | 1.25 | 1.5 | 0.87 |
| ... | ... | ... | ... | ... | ... |
| HDXZ | HEAD | PART NUMBER | TMR-A | NULL | 0.88 |
| HDXZ | HEAD | PART NUMBER | TMR-B | NULL | 0.87 |
| ... | ... | ... | ... | ... | ... |
| HDXZ | DISK | PART NUMBER | DK-G-U | NULL | 0.81 |
| HDXZ | DISK | PART NUMBER | DK-G-D | NULL | 0.68 |
| ... | ... | ... | ... | ... | ... |
| HDXY | HEAD | REPRODUCTION WIDTH | 0 | 0.1 | 0.89 |

FIG. 12

| PRODUCT NUMBER | PART NAME | CHARACTERISTIC NAME | VALUE 1 | VALUE 2 | PRODUCT TESTING YIELD |
|---|---|---|---|---|---|
| HDXZ | HEAD | REPRODUCTION WIDTH | 0 | 0.1 | 0.61 |
| HDXZ | HEAD | REPRODUCTION WIDTH | 0.1 | 0.2 | 0.68 |
| HDXZ | HEAD | REPRODUCTION WIDTH | 0.2 | 0.3 | 0.74 |
| HDXZ | HEAD | REPRODUCTION WIDTH | 0.3 | 0.4 | 0.78 |
| HDXZ | HEAD | REPRODUCTION WIDTH | 0.4 | 0.5 | 0.79 |
| HDXZ | HEAD | REPRODUCTION WIDTH | 0.5 | 0.6 | 0.83 |
| HDXZ | HEAD | REPRODUCTION WIDTH | 0.6 | 0.7 | 0.81 |
| HDXZ | HEAD | REPRODUCTION WIDTH | 0.7 | 0.8 | 0.68 |
| ... | ... | ... | ... | ... | ... |
| HDXZ | HEAD | RECORDING WIDTH | 0.5 | 0.6 | 0.69 |
| HDXZ | HEAD | RECORDING WIDTH | 0.6 | 0.7 | 0.67 |
| ... | ... | ... | ... | ... | ... |
| HDXZ | HEAD | OVERWRITE STRENGTH | 0.82 | 0.84 | 0.62 |
| HDXZ | HEAD | OVERWRITE STRENGTH | 0.84 | 0.86 | 0.69 |
| ... | ... | ... | ... | ... | ... |
| HDXZ | HEAD | ADJACENT TRACK INFLUENCE QUANTITY | 0.6 | 0.7 | 0.84 |
| HDXZ | HEAD | ADJACENT TRACK INFLUENCE QUANTITY | 0.7 | 0.8 | 0.81 |
| ... | ... | ... | ... | ... | ... |
| HDXZ | HEAD | SIGNAL AMPLITUDE | 2 | 2.2 | 0.83 |
| HDXZ | HEAD | SIGNAL AMPLITUDE | 2.2 | 2.4 | 0.86 |
| HDXZ | DISK | MAGNETIC FILM THICKNESS | 0.2 | 0.3 | 0.74 |
| HDXZ | DISK | MAGNETIC FILM THICKNESS | 0.3 | 0.4 | 0.78 |
| ... | ... | ... | ... | ... | ... |
| HDXZ | DISK | PROTECTIVE FILM THICKNESS | 0.1 | 0.2 | 0.83 |
| HDXZ | DISK | PROTECTIVE FILM THICKNESS | 0.2 | 0.3 | 0.81 |
| ... | ... | ... | ... | ... | ... |
| HDXZ | DISK | COERCIVITY | 1 | 1.25 | 0.83 |
| HDXZ | DISK | COERCIVITY | 1.25 | 1.5 | 0.87 |
| ... | ... | ... | ... | ... | ... |
| HDXZ | HEAD | PART NUMBER | TMR-A | NULL | 0.88 |
| HDXZ | HEAD | PART NUMBER | TMR-B | NULL | 0.87 |
| ... | ... | ... | ... | ... | ... |
| HDXZ | DISK | PART NUMBER | DK-G-U | NULL | 0.81 |
| HDXZ | DISK | PART NUMBER | DK-G-D | NULL | 0.68 |
| ... | ... | ... | ... | ... | ... |
| HDXY | HEAD | REPRODUCTION WIDTH | 0 | 0.1 | 0.89 |

FIG. 14

| HEAD SERIAL NUMBER | DEFECTIVE HEAD |
|---|---|
| TMRA01 | No |
| TMRB02 | No |
| TMRA03 | Yes |
| TMRB04 | No |
| ... | ... |
| TMRSA1 | No |

SERVO WRITE METHOD AND SERVO WRITE SYSTEM FOR HARD-DISK DRIVE

CROSS-REFERENCE TO RELATED APPLICATION

This application claims priority from the Japanese Patent Application No. 2008-308842, filed Dec. 3, 2008, the disclosure of which is incorporated herein in its entirety by reference.

TECHNICAL FIELD

Embodiments of the present invention relate to a hard-disk drive (HDD), and more particularly to a HDD production system and method that can record a servo signal on a magnetic-recording disk without using an actuator or clock head located outside of the HDD.

BACKGROUND

A HDD records and reproduces information on and from a magnetic-recording disk, which is a magnetic-recording medium, with a magnetic-recording head. One HDD incorporates one or a plurality of magnetic-recording disks according to the storage capacity thereof, and incorporates one or a plurality of magnetic-recording heads such that one magnetic-recording head is assigned to one recording surface of the magnetic-recording disk. A self-servo write method, in general, first selects one magnetic-recording head for position control from among a plurality of magnetic-recording heads of the HDD, and records a servo signal on a plurality of magnetic-recording disks simultaneously with the plurality of magnetic-recording heads while controlling the position by using the servo signal recorded by a position control head.

Engineers and scientists engaged in HDD manufacturing and development are interested in the methods and systems for servo writing HDDs that meet the rising demands of the marketplace for increased data-storage capacity, performance, and reliability.

SUMMARY

Embodiments of the present invention include a servo write method for a hard-disk drive. The method includes generating, with an input of characteristics of a magnetic-recording head and a magnetic-recording disk which are incorporated into the hard-disk drive, a yield prediction model from a correlation between yields of the hard-disk drive, and characteristics of the magnetic-recording head and the magnetic-recording disk of the hard-disk drive in a process. The method also includes predicting a yield which is obtained when each magnetic-recording head is used as a position control head, selecting as the position control head a magnetic-recording head that has a highest predicted yield, and writing a servo signal.

DESCRIPTION OF THE DRAWINGS

The accompanying drawings, which are incorporated in and form a part of this specification, illustrate embodiments of the invention and, together with the description, serve to explain the embodiments of the present invention:

FIG. 2 is a an example of a hard-disk drive (HDD) in which is shown an example of a servo signal recorded on a magnetic-recording disk of the HDD, in accordance with an embodiment of the present invention.

FIG. 9 is an example of a method for measuring signal amplitude, which is a characteristic of the magnetic-recording head, in accordance with an embodiment of the present invention.

FIG. 10 is an example of a production history database, in accordance with an embodiment of the present invention.

FIG. 11 is an example of a part characteristic database, in accordance with an embodiment of the present invention.

FIG. 12 is an example of a yield database, in accordance with an embodiment of the present invention.

FIG. 14 is an example of a yield database, in accordance with an embodiment of the present invention.

FIG. 19 is an example of defective head data, in accordance with an embodiment of the present invention.

Figure 1:
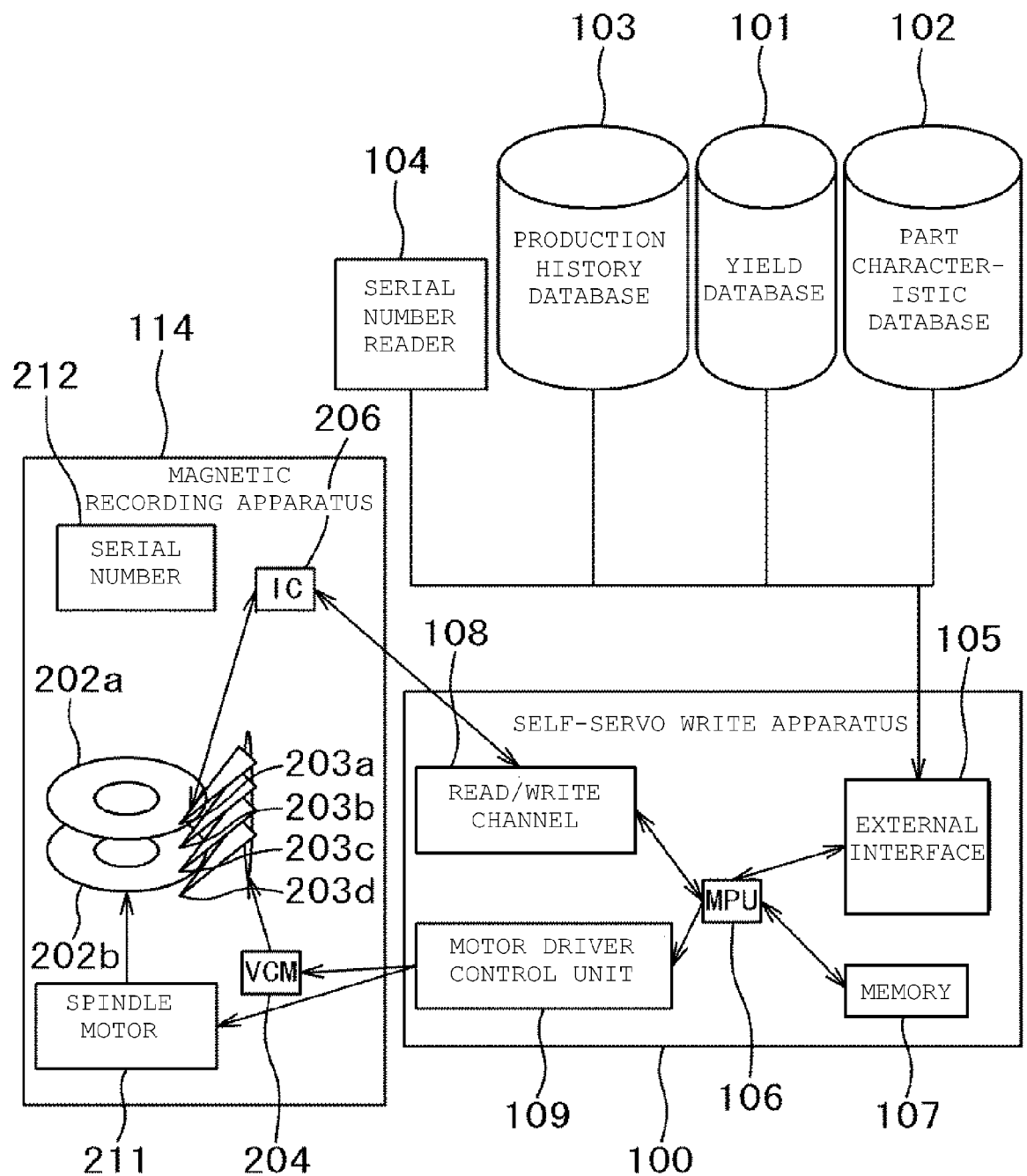
FIG. 1 is an example of a configuration of a self-servo write system, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Servo Write Method and a Servo Write System for a Hard-Disk Drive With relevance to embodiments of the present invention, in general, to detect the position of the magnetic-recording head above the magnetic-recording disk, the HDD disposes dozens or more servo signals per round on the recording surface of the magnetic-recording disk. Writing of the servo signals is generally performed in a production process called servo write. In the servo write process, in general, processing is performed by using an actuator, or clock head, located outside of the HDD, the actuator, or clock head, exclusively for servo write. On the other hand, a self-servo write method is known in the art by which a servo signal is recorded by using a magnetic-recording head of a hard-disk drive (HDD) without using an actuator, or clock head, that is exclusively dedicated for servo write located outside of the HDD.

As used herein, a HDD is a magnetic-recording apparatus; and, figures referring to a magnetic recording apparatus include embodiments of the present invention for a HDD. Also, as used herein, a magnetic-recording disk is a disk; and, figures referring to a disk include embodiments of the present invention for a magnetic-recording disk. Moreover, as used herein, a magnetic-recording head is a head; and, figures referring to a head include embodiments of the present invention for a magnetic-recording head.

The self-servo write method, in general, first selects one magnetic-recording head for position control from among a plurality of magnetic-recording heads of the HDD, referred to by the term of art, "position control head," and records a servo signal on a plurality of magnetic-recording disks simultaneously with the plurality of magnetic-recording heads while controlling the position by using the servo signal recorded by the position control head.

Sometimes the servo signal recorded by the position control head used for position control is unclear, or noise occurs at the time of reading, making it impossible to control the position in writing the servo signal. This sometimes makes it impossible to record a standards-compliant number of servo signals, or write or read the data after the completion of the HDD due to an improper position of the servo signal. Based on this, in accordance with embodiments of the present invention, the inventors found that a self-servo write yield, which is the ratio of the number of HDDs that can record a servo signal which meets the standards in the first servo signal writing process of each HDD to the total number of HDDs subjected to the self-servo write process, and a product testing yield, which is the ratio of the acceptable articles to the sum of the acceptable articles and the rejected articles in product testing that is performed subsequently, depend on various magnetic characteristics of the position control head, where the magnetic characteristics are associated with writing and reading.

As used herein, record and recording are referred to by the terms of art, "write," and "writing," respectively; and, figures referring to record and recording include embodiments of the present invention for "write," and "writing," respectively. As used herein, reproduce and reproducing, or reproduction, are referred to by the terms of art, "read," and "reading," respectively; and, figures referring to reproduce and reproducing, or reproduction, include embodiments of the present invention for "read," and "reading," respectively.

Embodiments of the present invention provide a means for addressing the above-described issues is a servo write method and a servo write system for a HDD that predict, for each HDD, a yield which will be obtained when each of the magnetic-recording heads incorporated in the HDD is used as a position control head by using the relationship between the part characteristics and the yield, and select the magnetic-recording head having the highest predicted yield as the position control head. By using embodiments of the present invention in the production of a HDD, the yield of a servo write process and the yield of a product testing process may be increased. Thus, in accordance with embodiments of the present invention, the productivity of the servo write process may be increased; and, production costs may be reduced. Embodiments of the present invention are next described in detail using various examples.

EXAMPLE 1

In accordance with embodiments of the present invention, an example of a HDD including four magnetic-recording heads is next described. However, embodiments of the present invention are not limited to a HDD including four magnetic-recording heads; a similar method can be applied to other HDDs, as long as the method includes a plurality of magnetic-recording heads regardless of the number of magnetic-recording heads. Moreover, part data is used that includes data on a magnetic-recording head and a magnetic-recording disk; however, a similar method can be applied, as long as there are one or more parts using data.

With reference now to FIG. 2, in accordance with an embodiment of the present invention, an example of a HDD is shown; and, in a lower portion of FIG. 2, an example of a servo signal recorded on a magnetic-recording disk of the HDD is shown. In FIG. 2, to make the internal parts of the HDD more viewable, a state of the HDD is shown in which a cover is removed from the disk enclosure (DE). The HDD includes two magnetic-recording disks 202a and 202b, each including a magnetic-recording medium having information recording surfaces on the front and back surfaces of the magnetic-recording disks 202a and 202b, and four magnetic-recording heads 203a, 203b, 203c, and 203d that write signals that contain information to, and read signals that contain information from, the magnetic-recording media of the two magnetic-recording disks 202a and 202b.

The magnetic-recording heads 203a, 203b, 203c, and 203d are respectively supported on arms 208a, 208b, 208c, and 208d that can rotate about a pivot 205, and are moved in an arbitrary radial position above a corresponding one of the magnetic-recording disks 202a and 202b by the action of a voice coil motor (VCM) 204 which is part of an actuator. Moreover, the magnetic-recording heads 203a, 203b, 203c, and 203d are driven by an IC 206 to perform a write operation, or alternatively, a read operation.

When the magnetic-recording heads 203a, 203b, 203c, and 203d are not performing a write operation, or a read operation, the magnetic-recording heads 203a, 203b, 203c, and 203d are retracted to a ramp mechanism 207 located off to one side from the magnetic-recording disk 202, so that the magnetic-recording heads 203a, 203b, 203c, and 203d are held above the magnetic-recording disks 202a and 202b away from the magnetic-recording disks 202a and 202b. These components are incorporated into a housing 201; and, a serial number 212 of the HDD is affixed to the housing, for example, by using a sticker.

With further reference to FIG. 2, in accordance with an embodiment of the present invention, a servo signal 210 is shown in a lower portion of FIG. 2 that is written on both recording surfaces of the magnetic-recording disks 202a and 202b in the above-described HDD by using the magnetic-recording heads 203a, 203b, 203c, and 203d of the HDD. The servo signal is used for detecting the position of the magnetic-recording head above the magnetic-recording disk.

Figure 3:
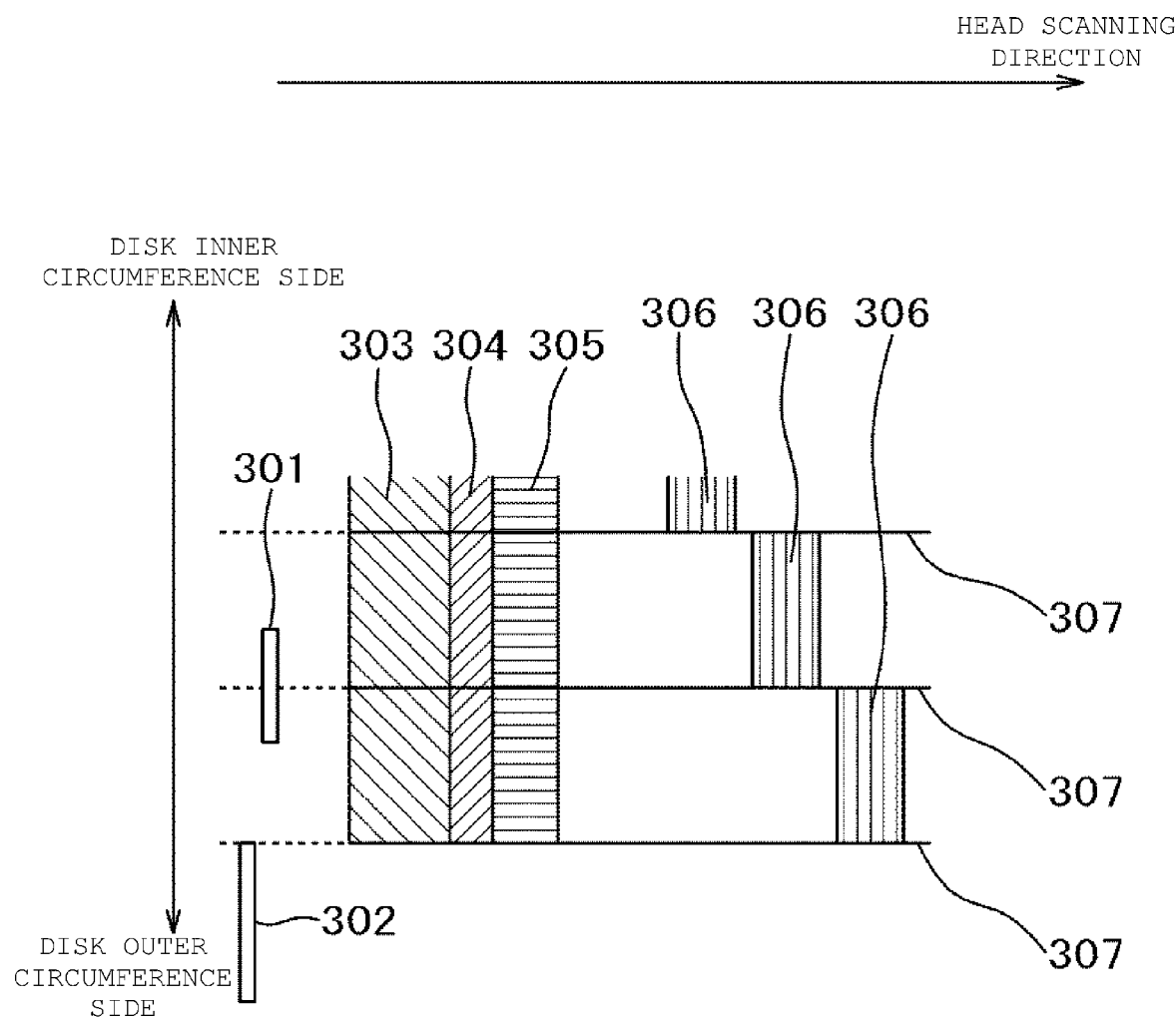
FIG. 3 is an example of a servo signal, in accordance with an embodiment of the present invention.

With reference now to FIG. 3, in accordance with an embodiment of the present invention, an example is shown of the servo signal 210 on the magnetic-recording disks 202a and 202b shown in FIG. 2. In a pattern of the servo signal shown in FIG. 3, at the head of the pattern of the servo signal 210, a preamble 303 for automatic gain adjustment is located, followed by a sector marker 304 for detecting the circumferential position of the magnetic-recording head, and, at the back of the pattern of the servo signal 210, a track ID code 305 for detecting the radial position of the magnetic-recording head and a burst pattern 306 are provided. This burst pattern is, in this example, circumferentially divided into three sections; and, the bursts in these sections are disposed in such a way that the bursts are offset in the direction of the radius of the magnetic-recording disk while maintaining the same width as that of servo track 307 in the direction of the radius of the magnetic-recording disk.

Figure 4:
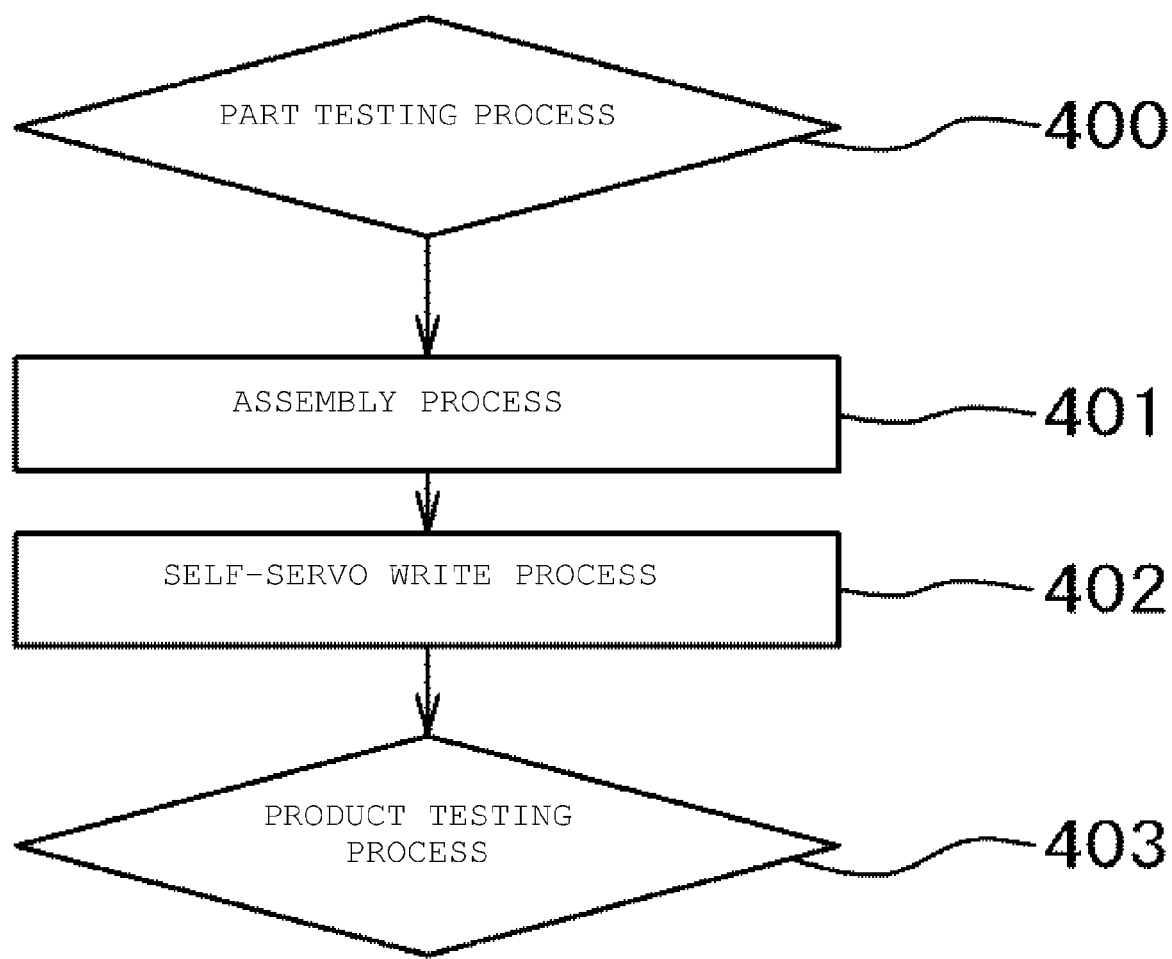
FIG. 4 is an example of a production process of the HDD, in accordance with an embodiment of the present invention.

With reference now to FIG. 4, in accordance with an embodiment of the present invention, an example is shown of a flow chart showing a procedure for producing the HDD. From the parts subjected to a part testing process 400, the HDD is assembled in an assembly process 401. At the time of assembly, the serial numbers of the parts incorporated into each HDD and the serial number 212 of the HDD are stored in a production history database 103, which is subsequently described. Next, a servo signal is recorded in a self-servo write process 402.

In the self-servo write process 402, the serial number 212 of the HDD and the result of self-servo write are stored. Finally, pass/fail results are given in a product testing process 403; and, acceptable articles are shipped as products. At the time of product testing, the serial number 212 of the HDD and the result of product testing are stored. In the part testing process 400, the characteristics of each part are measured. In a test of the magnetic-recording head 203 the following are, for example, measured: a read width, a write width, overwrite strength, an adjacent track influence quantity, and signal amplitude. As described herein, a read width is also referred to as a reproduction width; and a write width is also referred to as a recording width.

Figure 5:
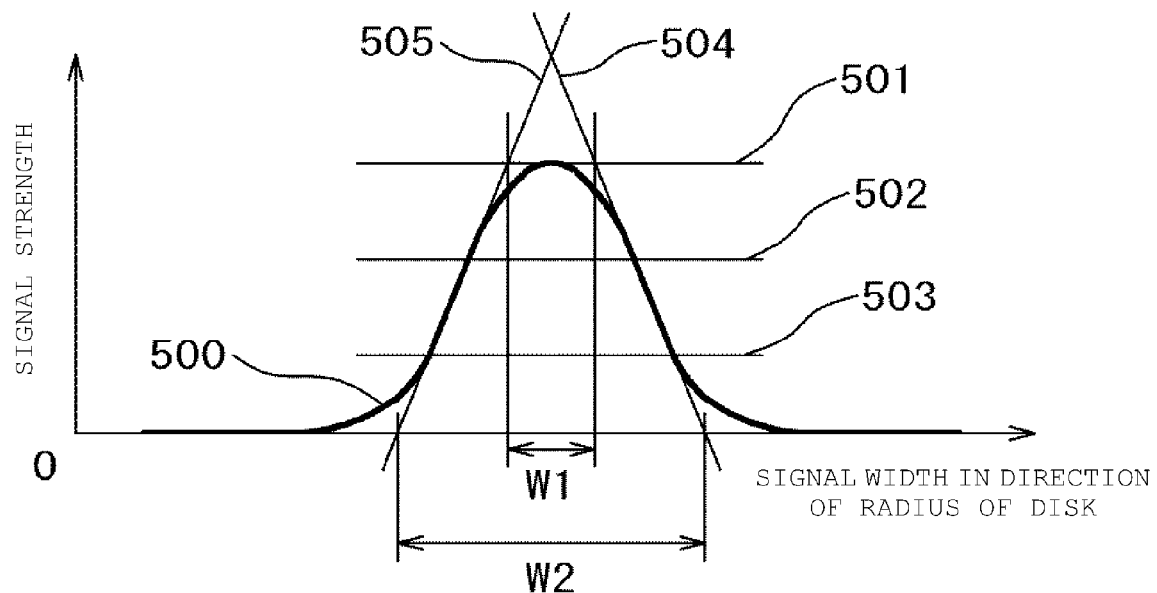
FIG. 5 is an example of a method for measuring a read width, also referred to herein as a reproduction width, which is a characteristic of a magnetic-recording head, in accordance with an embodiment of the present invention.

With reference now to FIG. 5, in accordance with an embodiment of the present invention, an example is shown of a method for measuring the read width of the magnetic-recording head 203 in the part testing process 400. The horizontal axis represents a signal width in the direction of the radius of a magnetic-recording disk, and the vertical axis represents signal strength, which may be given in units of voltage. The read width is the width of a signal, which a read element reads. In the measurement of the read width, a 1-bit magnetic signal is first written on the magnetic-recording disk; and, the written signal 500 is then read by a read element of the magnetic-recording head. The width of the signal thus read is the read width.

The following is a geometrical explanation of what has been described above. A 100% quantile line 501, a 70% quantile line 502, and a 30% quantile line 503 of the written signal 500 are drawn. Next, lines 504 and 505 passing through the points of intersection of the written signal 500 and the 70% quantile line 502 and the points of intersection of the written signal 500 and the 30% quantile line 503 are drawn. The width between the points of intersection of the lines 504 and 505 and the 100% quantile line 501 is defined as W1, and the width between the points of intersection of the lines 504 and 505 and the horizontal axis is defined as W2. At this time, the read width is the quotient of a difference between W2 and W1 divided by 2.

Figure 6:
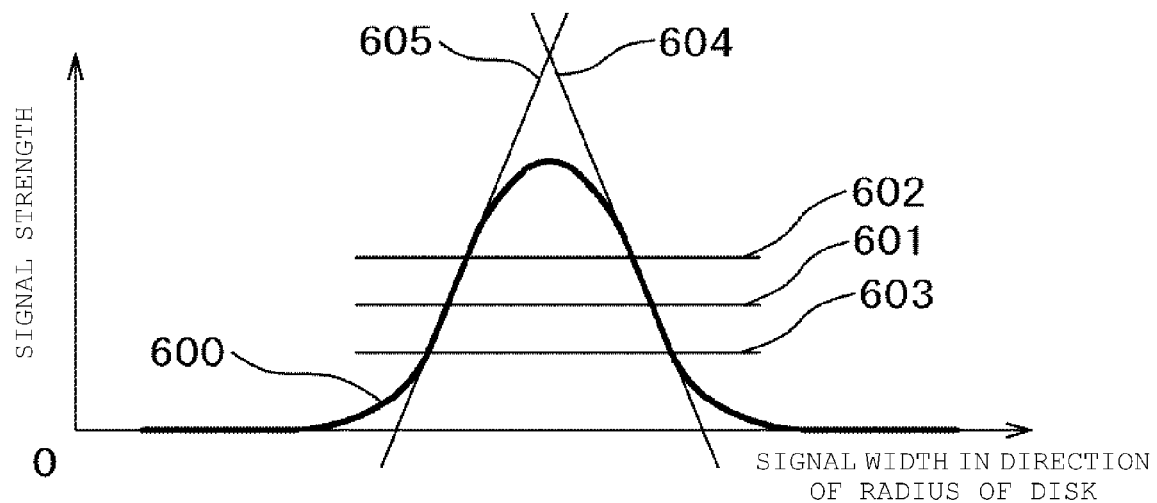
FIG. 6 is an example of a method for measuring a write width, also referred to herein as a recording width, which is a characteristic of the magnetic-recording head, in accordance with an embodiment of the present invention.

With reference now to FIG. 6, in accordance with an embodiment of the present invention, an example is shown of a method for measuring the write width of the magnetic-recording head 203 in the part testing process 400. The horizontal axis represents a signal width in the direction of the radius of a magnetic-recording disk, and the vertical axis represents signal strength, which may be given in units of voltage. The write width is the width of a signal when a 1-bit magnetic signal is written on the magnetic-recording disk by using a write element of the magnetic-recording head. In the measurement of the write width, a 1-bit magnetic signal is first written on the magnetic-recording disk, and the written signal 600 is then read by the read element of the magnetic-recording head. The width of the signal thus read is the write width.

The following is a geometrical explanation of what has been described above. A 50% quantile line 601, a 70% quantile line 602, and a 30% quantile line 603 of the written signal 600 are drawn. Next, lines 604 and 605 passing through the points of intersection of the written signal 600 and the 70% quantile line 602 and the points of intersection of the written signal 600 and the 30% quantile line 603 are drawn. The write width is the width between the points of intersection of the tangents 604 and 605 and the 50% quantile line 601.

Figure 7:
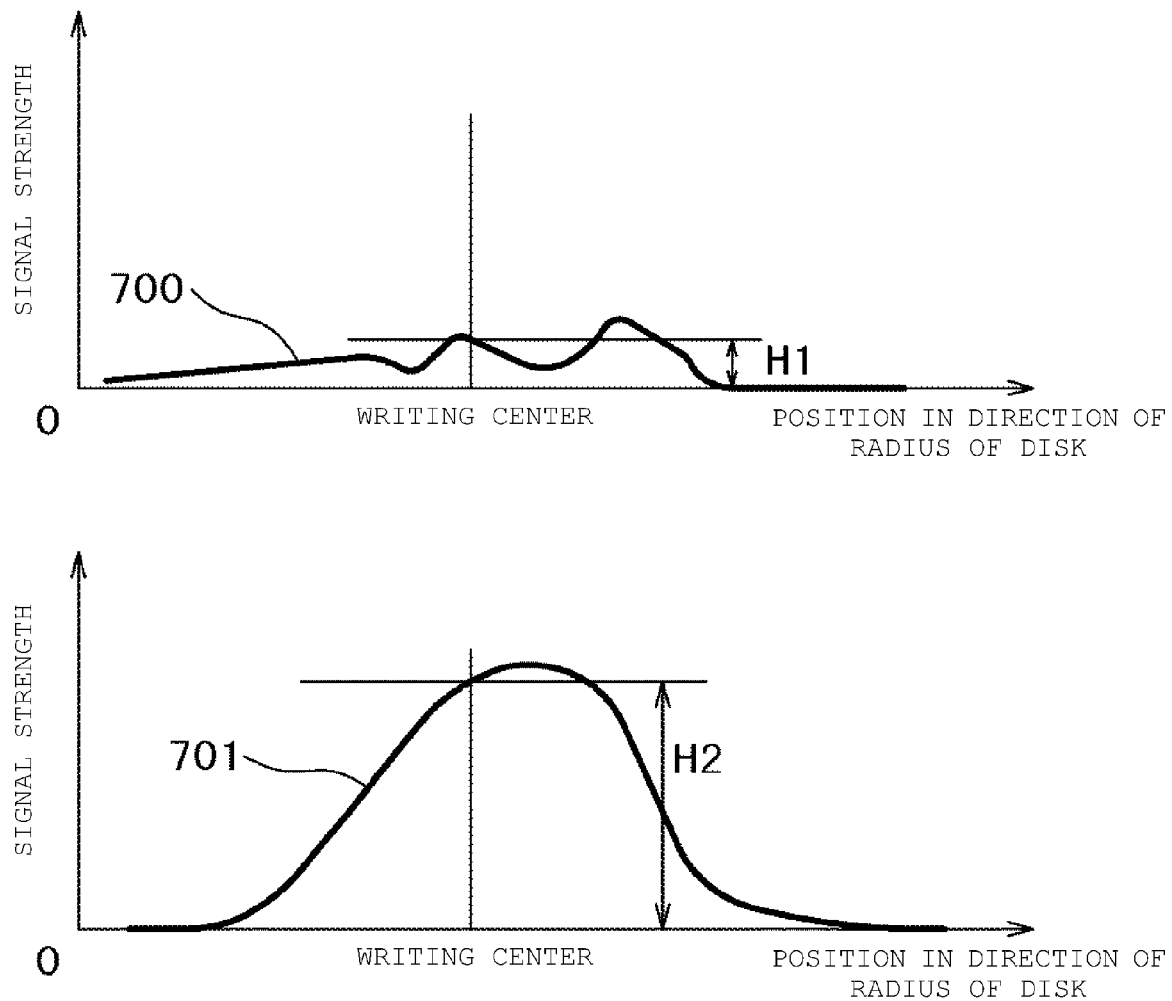
FIG. 7 is an example of a method for measuring overwrite strength, which is a characteristic of the magnetic-recording head, in accordance with an embodiment of the present invention.

With reference now to FIG. 7, in accordance with an embodiment of the present invention, an example is shown of a method for measuring the overwrite strength of the magnetic-recording head 203 in the part testing process 400. The horizontal axis of the two graphs represents a position in the direction of the radius of a magnetic-recording disk, and the vertical axis represents signal strength, which may be given in units of voltage. The overwrite strength is the ratio of the strength of a signal written at a low frequency to the strength of a signal written at a high frequency when, after a 1-bit magnetic signal is written on the magnetic-recording disk by passing a low-frequency alternating current through a write element of the magnetic-recording head, a 1-bit magnetic signal is written on the magnetic-recording disk by passing a high-frequency alternating current through the write element of the magnetic-recording head.

An upper signal 700 of FIG. 7 is a signal written at a low frequency, and a lower signal 701 is a signal written at a high frequency. The overwrite strength is the quotient of a signal strength H2 of the signal 701 in a writing center position divided by a maximum signal strength H1 of the signal 700 in a writing center position.

Figure 8:
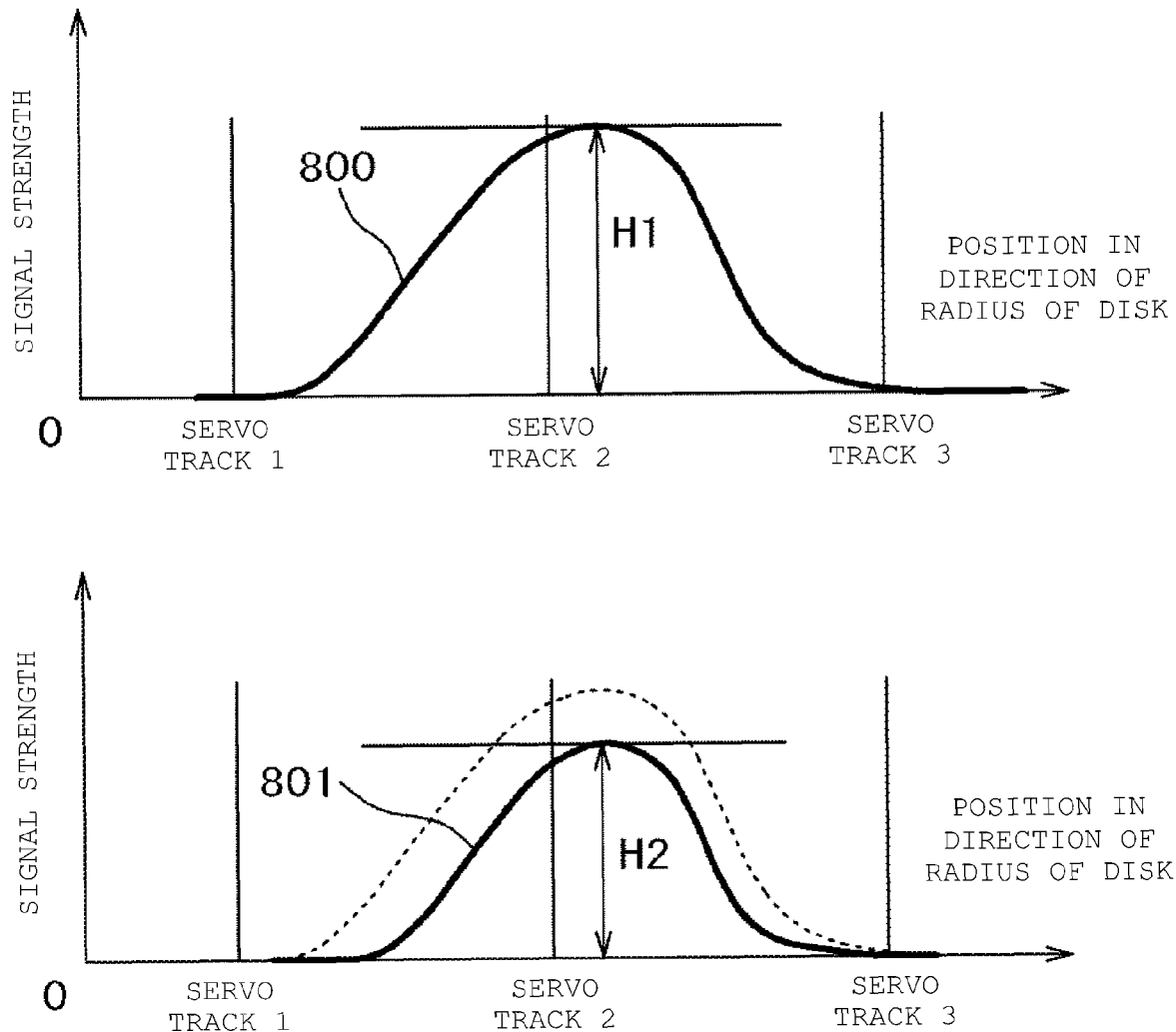
FIG. 8 is an example of a method for measuring an adjacent track influence quantity, which is a characteristic of the magnetic-recording head, in accordance with an embodiment of the present invention.

With reference now to FIG. 8, in accordance with an embodiment of the present invention, an example is shown of a method for measuring the adjacent track influence quantity of the magnetic-recording head 203 in the part testing process 400. The horizontal axis of the two graphs represents a position in the direction of the radius of a magnetic-recording disk, and the vertical axis represents signal strength, which may be given in units of voltage. The adjacent track influence quantity is the ratio of the signal strength of a 1-bit magnetic signal that is written on one servo track 307 shown in FIG. 3 to the signal strength of the 1-bit magnetic signal that is written on the one servo track 307, after servo tracks adjacent to the one servo track 307 are erased.

An upper signal 800 of FIG. 8 is a signal when a 1-bit magnetic signal is written on a middle servo track 2; and, a lower signal 801 is a signal when, after a 1-bit magnetic signal is written on the middle servo track 2, erasing is performed on servo tracks 1 and 3 adjacent to the middle servo track 2. The adjacent track influence quantity is the quotient of a maximum signal strength H2 of the signal 801 divided by maximum signal strength H1 of the signal 800.

With reference now to FIG. 9, in accordance with an embodiment of the present invention, an example is shown of a method for measuring the signal amplitude of the magnetic-recording head 203 in the part testing process 400. The horizontal axis of the two graphs represents a signal width in the direction of the radius of a magnetic-recording disk, and the vertical axis represents signal strength, which may be given in units of voltage. The signal amplitude is the sum of the absolute values of the signal strength of two magnetic signals of opposite sign. An upper signal 900 of FIG. 9 is a positive signal, and a lower signal 901 is a negative signal. The signal amplitude is the sum of the absolute value of maximum signal strength H1 of the signal 900 and the absolute value of maximum signal strength H2 of the signal 901.

Figure 17:
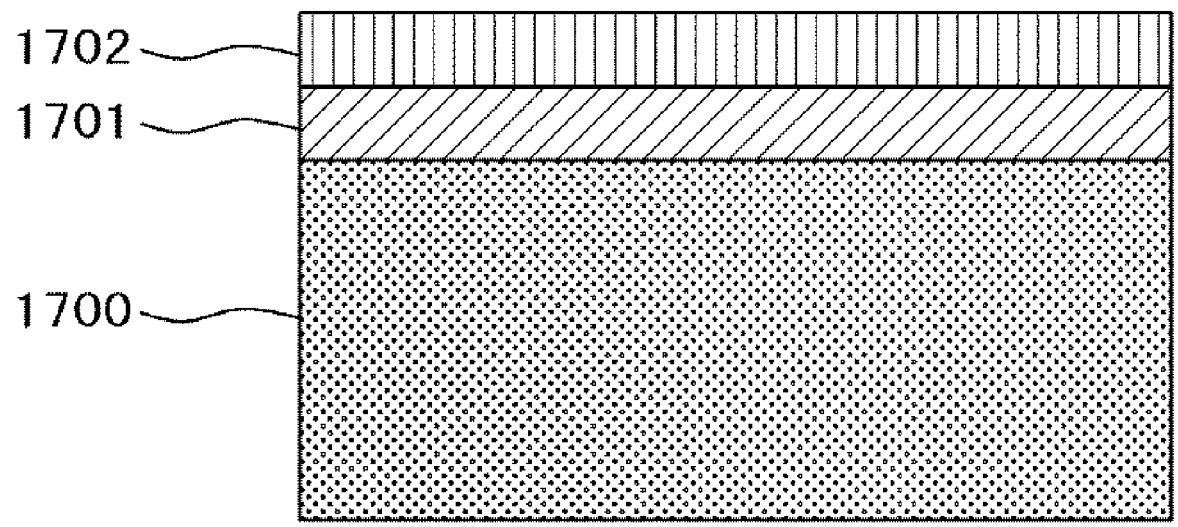
FIG. 17 is an example of the film composition of a magnetic-recording disk, in accordance with an embodiment of the present invention.

With reference now to FIG. 17, in accordance with an embodiment of the present invention, an example is shown of the film composition of the magnetic-recording disk 202. The magnetic-recording disk 202 includes: a substrate 1700 such as aluminum or glass; a magnetic film 1701 formed of an alloy of nickel or cobalt, or similar magnetic alloy; and, a protective film 1702 formed of carbon, or similar material. The film thickness of the magnetic film 1701 and the protective film 1702 of the magnetic-recording disk 202 are measured, for example, by fluorescent X-ray analysis in the part testing process.

Figure 18:
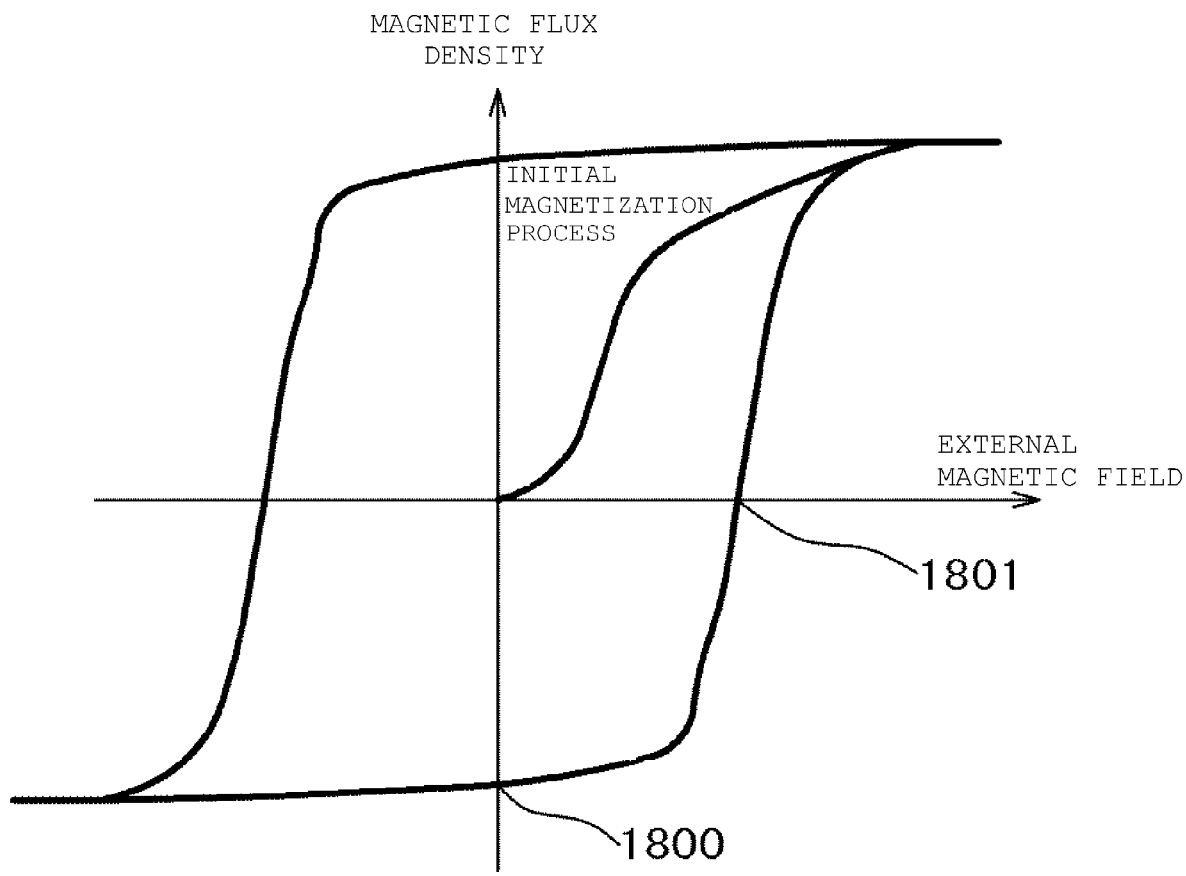
FIG. 18 is an example of a hysteresis curve of a magnetic film of a magnetic-recording disk, in accordance with an embodiment of the present invention.

With reference now to FIG. 18, in accordance with an embodiment of the present invention, an example is shown of a hysteresis curve of the magnetic film 1701. The horizontal axis represents an external magnetic field, and the vertical axis represents the magnetic flux density of the magnetic film. The magnetic flux density remaining when the external magnetic field becomes zero is referred to as residual magnetization 1800. The strength of the external magnetic field when the magnetic flux density becomes zero by further adding an opposite direction external magnetic field is coercivity 1801. The coercivity 1801 of the magnetic-recording disk 202 is measured in the part testing process, for example, by a magnetic field measuring apparatus.

With reference now to FIG. 1, in accordance with an embodiment of the present invention, an example is shown in which a HDD to be processed is set in a self-servo write system configuration. The self-servo write system includes: a self-servo write apparatus 100, a yield database 101, a part characteristic database 102, a production history database 103, and a serial number reader 104.

The self-servo write apparatus includes: an external interface 105 for connection with a database, an MPU 106 which controls the whole system, a memory 107 for temporarily retaining data, a read/write channel 108 which transmits a read signal to the magnetic-recording head of a HDD and receives a write signal from the magnetic-recording head of a HDD, and a motor driver control unit 109 which controls a spindle motor 211 and a VCM 204 of the HDD. The serial number reader 104 reads the serial number 212 of the HDD set in the self-servo write apparatus.

With reference now to FIG. 10, in accordance with an embodiment of the present invention, an example is shown of data indicating a serial number of a part incorporated into each HDD, the data stored in the production history database 103. Data 1000 indicates a serial number of the magnetic-recording head 203 incorporated into each HDD. Data 1001 indicates a serial number of the magnetic-recording disk 202 incorporated into each HDD.

For example, the data stored in the production history database 103 indicates that, in the HDD whose product number is HDXZ and whose serial number 212 is HDXZ001: TMRA01 is used as the top magnetic-recording head 203$a$; TMRB02 is used as the magnetic-recording head 203$b$, which is the second one from the top; TMRA03 is used as the magnetic-recording head 203$c$, which is the third one from the top; and, TMRB04 is used as the magnetic-recording head 203$d$, which is the fourth one from the top. The data stored in the production history database 103 further indicates that, as the magnetic-recording disks 202 corresponding to the magnetic-recording heads 203, DKG123U, DKG123D, DKG456U, and DKG456D are used. For example, a magnetic-recording disk 202 has a recording surface on both the front and back surfaces of the magnetic-recording disk 202; and, both surfaces are tested and have different characteristics. To manage each characteristic, for the sake of convenience, for example, different serial numbers are assigned to the front and back of a magnetic-recording disk and are managed.

With reference now to FIG. 11, in accordance with an embodiment of the present invention, an example is shown of the data stored in the part characteristic database 102, which include characteristic data 1100 of the magnetic-recording head 203 and characteristic data 1101 of the magnetic-recording disk 202. The part characteristics include, for example, a measurement value and a part number. For example, the data stored in the part characteristic database 102 indicates that the magnetic-recording head 203 whose serial number is TMRB02 has: a read width of 0.54 nm, a write width of 0.547 nm, an overwrite strength of 0.83, an adjacent track influence quantity of 0.65, a signal amplitude of 2.3 mV, and a part number TMR-A. Moreover, for example, the data stored in the part characteristic database 102 indicates that the magnetic-recording disk 202 whose serial number is DKG123D has: a magnetic film thickness of 0.35 nm, a protective film thickness of 0.13 nm, a coercivity of 1.45 A/m, and a part number DK-G-D.

With reference now to FIG. 12, in accordance with an embodiment of the present invention, an example is shown of the data stored in the yield database 101 that includes data indicating, for each product, the relationship between the part characteristics and the self-servo write yield. For example, the data stored in the yield database 101 indicates that the self-servo write yield is 0.83 when a product is HDXZ and satisfies the condition that the read width of the magnetic-recording head is 0.5 nm or more but less than 0.6 nm. Moreover, for example, the data stored in the yield database 101 indicates that the self-servo write yield is 0.81 when a product is HDXZ and satisfies the condition that the part number of the magnetic-recording disk 202 is DK-G-U.

The yield is determined by dividing the number of HDDs that can record a servo signal which meets the standards in the first servo signal writing process of each HDD by the number of HDDs subjected to the self-servo write process by using the past performance in the previous month, for example, when the characteristics of the position control head and the corresponding magnetic-recording disk 202 satisfy the conditions.

Figure 15:
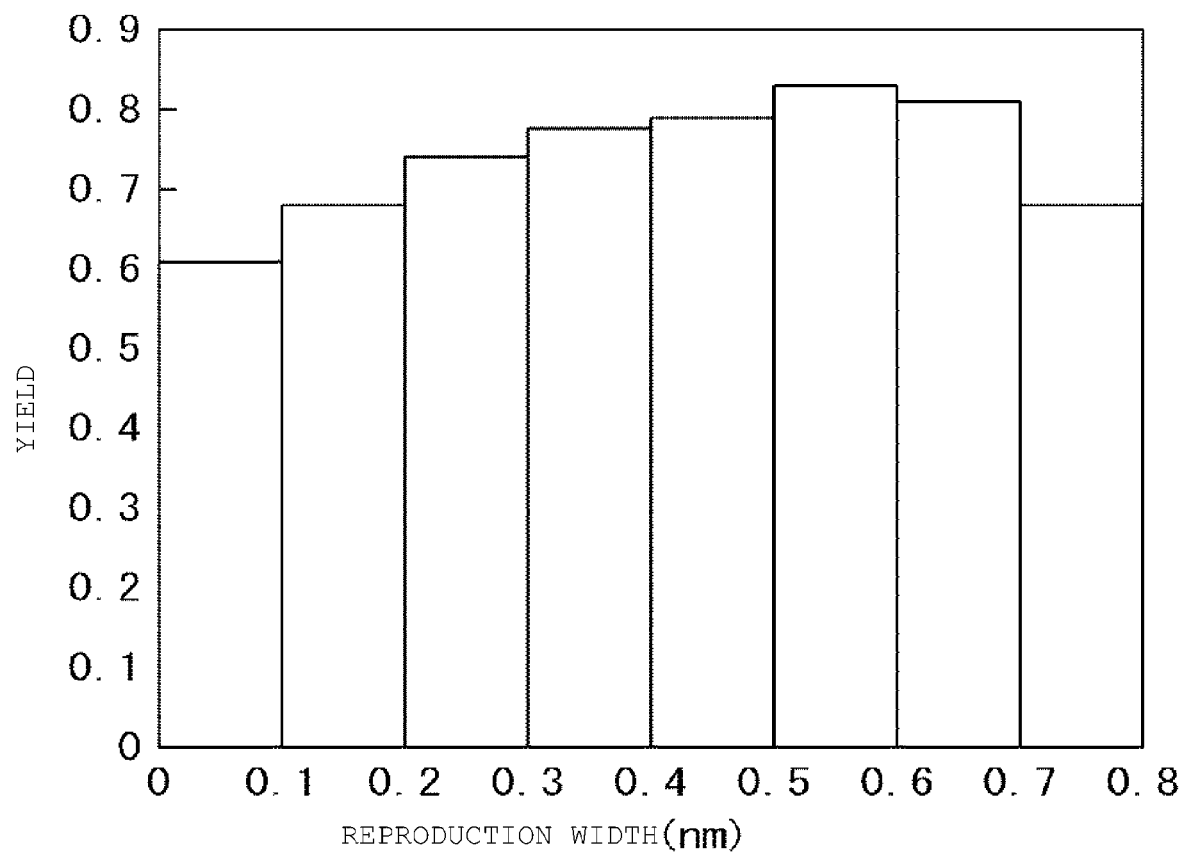
FIG. 15 is an example of yields for the read width, also referred to herein as a reproduction width, of a position control head, in accordance with an embodiment of the present invention.

For example, with reference now to FIG. 15, in accordance with an embodiment of the present invention, the self-servo write yield for the read width of the position control head of a product HDXZ can be obtained by obtaining the yield when the read width of the position control head is 0 or more but less than 0.1 nm by dividing the number of HDDs that can record a servo signal which meets the standards in the first servo signal writing process of each HDD by the number of HDDs subjected to the self-servo write process by using the past performance achieved when the read width of the position control head is 0 or more but less than 0.1 nm, repeatedly performing the process for a case in which the width is 0.1 nm or more but less than 0.2 nm and a case in which the width is 0.2 nm or more but less than 0.3 nm as shown in FIG. 15, and compiling the self-servo write yield for the read width of the position control head of a product HDXZ into data in tabular form.

Figure 16:
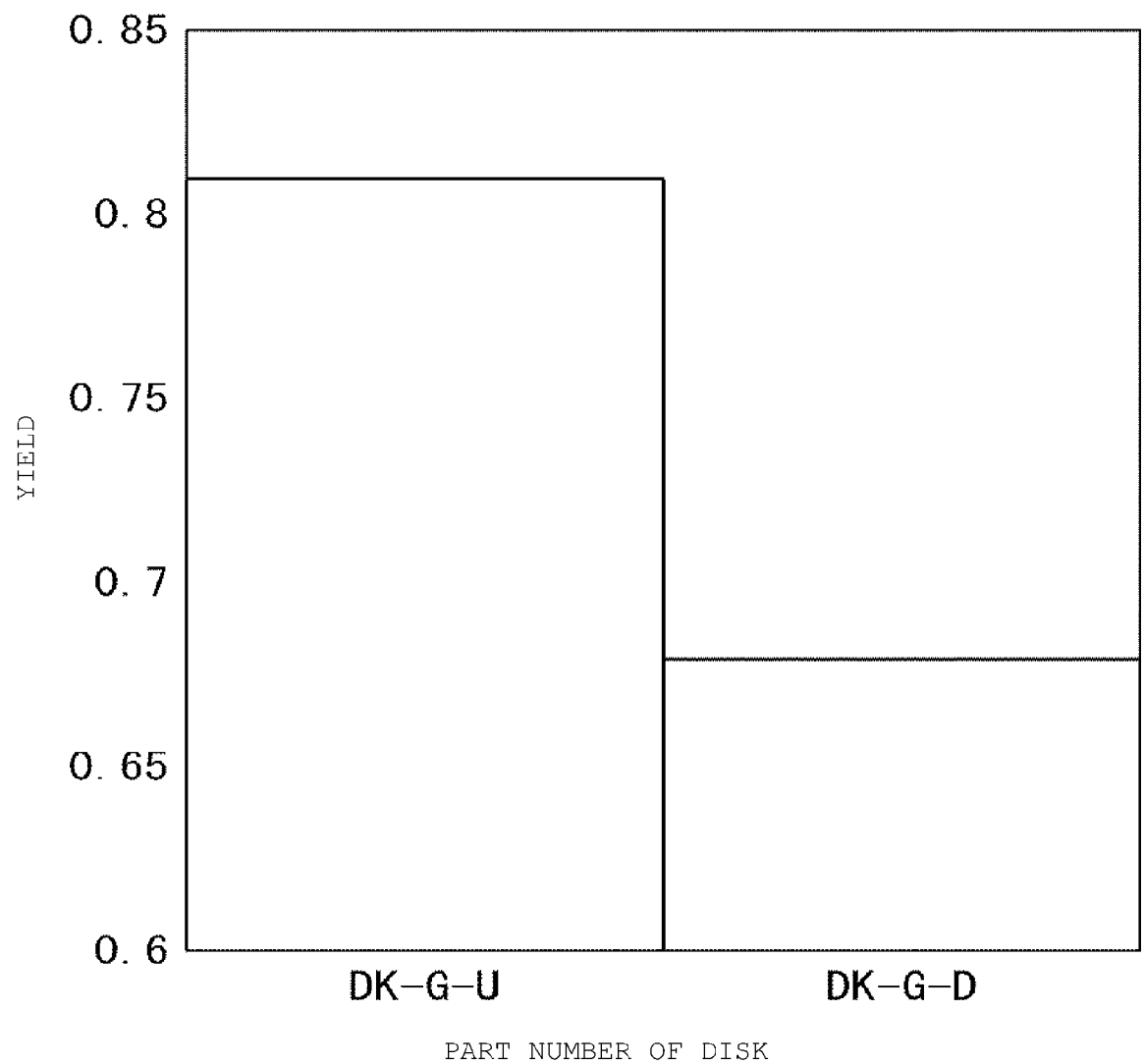
FIG. 16 is an example of yields for a magnetic-recording disk part number, in accordance with an embodiment of the present invention.

Likewise, with reference now to FIG. 16, in accordance with an embodiment of the present invention, the self-servo write yield for the part number of a magnetic-recording disk used in a product HDXZ can be obtained by obtaining the yield when the part number of the magnetic-recording disk 202 is DK-G-U by dividing the number of HDDs that can record a servo signal which meets the standards in the first servo signal writing process of each HDD by the number of HDDs subjected to the self-servo write process by using the past performance achieved when the part number of the magnetic-recording disk 202 corresponding to the position control head is DK-G-U, obtaining the yield when the part number is DK-G-D in a similar manner as shown in FIG. 16, and compiling the self-servo write yield for the part number of a magnetic-recording disk used in a product HDXZ into data in tabular form.

Figure 13:
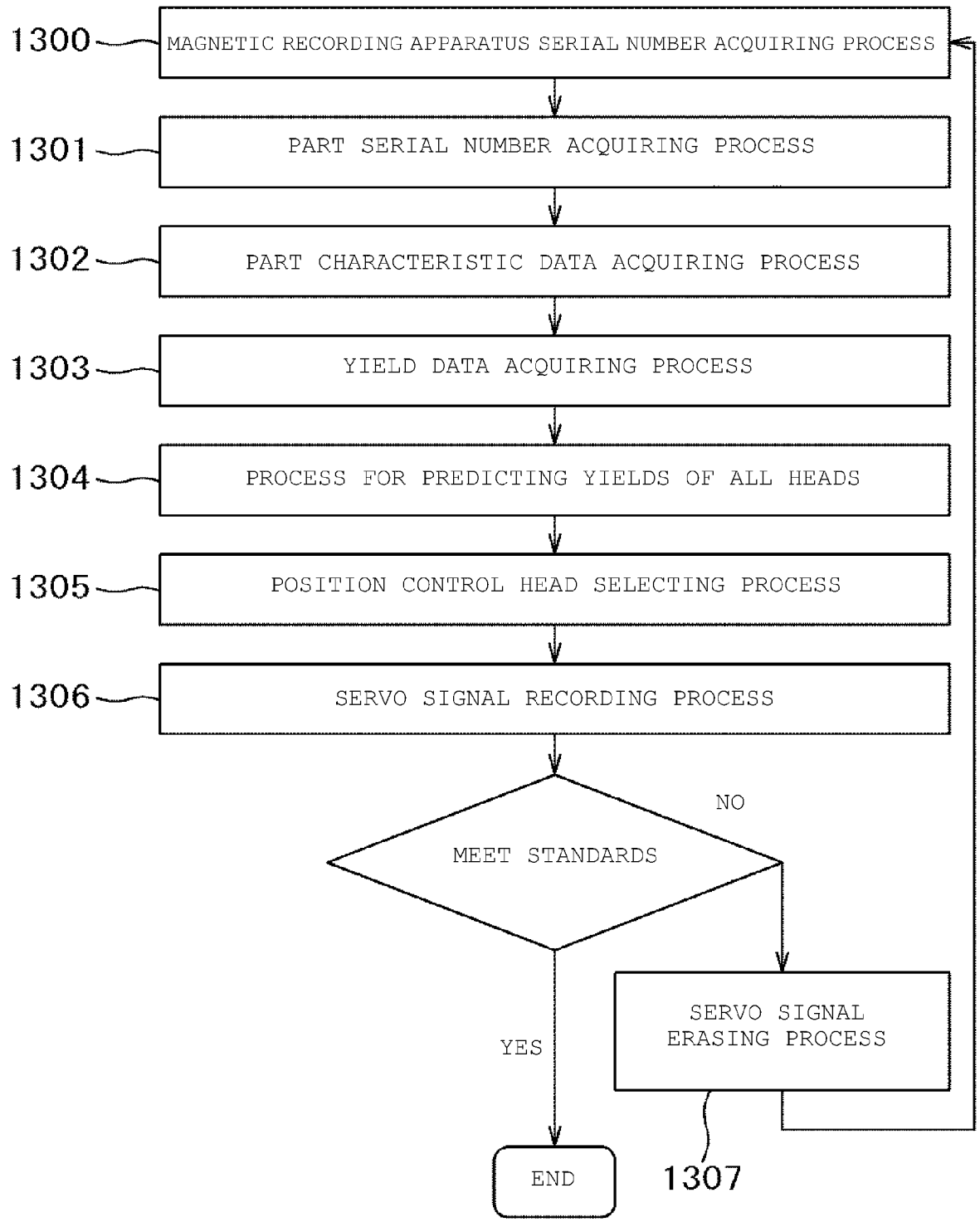
FIG. 13 is an example of a process flow in a self-servo write process, in accordance with an embodiment of the present invention.

With reference now to FIG. 13, in accordance with an embodiment of the present invention, an example is shown of a process flow in the self-servo write process 402. In a HDD serial number reading process 1300, the serial number 212 of the HDD set in the self-servo write apparatus is read via the serial number reader 104, for example, by using a bar code. In a part serial number acquiring process 1301, the serial number of a part incorporated into the HDD is acquired.

For example, the production history database 103 shown in FIG. 10 indicates that the serial numbers of the magnetic-recording heads 203 incorporated into the HDD whose serial number 212 is HDXZ001 are: TMRA01, TMRB02, TMRA03, and TMRB04. Likewise, the serial numbers of the magnetic-recording disks 202 are: DKG123U, DKG123D, DKG456U, and DKG456D. In a part characteristic data acquiring process 1302, the characteristics of the part acquired in the above-described part serial number acquiring process are acquired.

For example, from the part characteristic database 102 shown in FIG. 11, the characteristics of the magnetic-recording head TMRA01 are such that: the read width is 0.66 nm; the write width is 0.657 nm; the overwrite strength is 0.85; the adjacent track influence quantity is 0.74; the signal amplitude is 2.1 mV; and, the part number is TMR-A. In a yield data acquiring process 1303, the yield corresponding to the part characteristics acquired in the previous process is acquired from the yield database 101 shown in FIG. 12.

For example, when the read width of the magnetic-recording head is 0.66 nm, a corresponding yield is 0.81. In a process 1304 for predicting the yields of all the magnetic-recording heads, a yield which will be obtained when each magnetic-recording head is used as a position control head is predicted. A method for predicting the yield of each magnetic-recording head may be performed, for example, by calculating a geometric average as in "Expression 1" from the yield corresponding to the characteristics of a magnetic-recording head and a magnetic-recording disk combined with the magnetic-recording head.

$$\text{Predicted yield} = \sqrt[n]{\prod_{i=1}^{n} y_i} \quad \text{[Expression 1]}$$

In "Expression 1", $y_i$ is the yield corresponding to the characteristics of a magnetic-recording head and a magnetic-recording disk; and, n is the number of characteristics used.

For example, a predicted yield by a geometric average when each magnetic-recording head incorporated into a HDD whose serial number is HDXZ001 is used as a position control head can be obtained by first multiplying: the yield corresponding to the read width; the yield corresponding to the write width, the yield corresponding to the overwrite strength; the yield corresponding to the adjacent track influence quantity; the yield corresponding to the signal amplitude; the yield corresponding to the part number of the magnetic-recording head; the yield corresponding to the magnetic film thickness; the yield corresponding to the protective film thickness; the yield corresponding to the coercivity; and the yield corresponding to the part number of the magnetic-recording disk; and, then, calculating the tenth root of the product thus obtained. The tenth root is adopted here because there are ten factors having an influence on the above-described predicted yield.

Of the factors having an influence on the above-described predicted yield, the yield for the part number of the magnetic-recording head includes an influence of the structure of the magnetic-recording head, or alternatively, the production process of the magnetic-recording head. Moreover, the yield for the part number of the magnetic-recording disk includes an influence of the structure of the magnetic-recording disk, or alternatively, the production process of the magnetic-recording disk.

Furthermore, when the use of all the measured part characteristics causes a reduction in the prediction accuracy, a part characteristic to be used is selected in such a way, for example, as to prevent the correlation between the part characteristics to be used from becoming strong, and the other part characteristics are not used. In a position control head selecting process 1305, from among the magnetic-recording heads incorporated into the HDD, a magnetic-recording head having the highest yield predicted in the previous process is selected as a position control head. Then, in a servo signal writing process 1306, writing of a servo signal is performed while controlling the position by the position control head selected in the previous process. Then, when the recorded servo signal meets the standards, the process is ended.

With reference now to FIG. 19, in accordance with an embodiment of the present invention, an example is shown of defective head data. If the recorded servo signal does not meet the standards, a servo signal erasing process 1307 is performed, and the process is re-performed from the HDD serial number reading process. When the recorded servo signal does not meet the standards, the head used at the time as a position control head may be treated as a defective head, defective head data shown in FIG. 19 may be stored in the production history database 103, and a head other than the defective head may be preferentially selected as a position control head when the process is re-performed.

A method for predicting the yield of each magnetic-recording head in the process 1304 for predicting the yields of all the magnetic-recording heads may be a geometric average as described above, or alternatively, an arithmetic average may be used as in "Expression 2".

$$\text{Predicted yield} = \frac{1}{n}\sum_{i=1}^{n} y_i \quad \text{[Expression 2]}$$

In "Expression 2", $y_i$ is the yield corresponding to the characteristics of a magnetic-recording head and a magnetic-recording disk; and, n is the number of characteristics used.

Moreover, since the invention simply has to be able to compare the predicted yields to determine which one is higher or lower than the other in order to select a position control head, instead of a geometric average, a product may be simply calculated alone without calculating a root. Likewise, instead of calculating an arithmetic average, a total sum may be calculated. In addition, when a geometric average, or alternatively, a product is used, by setting the yield for an outlier of a part characteristic to zero, the predicted yield of a low-reliability magnetic-recording head having an outlier in characteristics may be set to zero.

As a result, such a magnetic-recording head is not selected as a position control head, which may prevent a reduction in yield. When an arithmetic average, or alternatively, a total sum is used as a method for predicting the yield of each magnetic-recording head, even when the yield for an outlier of a part characteristic is set to zero, due to the yield for the other part characteristics, the predicted yield does not become zero. Therefore, a low-reliability magnetic-recording head having an outlier in characteristics might be selected as a position control head, causing a reduction in yield.

EXAMPLE 2

The yield of self-servo write described in Example 1 is judged based on, for example, whether writing of a servo signal by a head used as a position control head is successfully performed for a predetermined number of tracks. However, as a product, not only whether or not a predetermined number of tracks have been simply written into the HDD, but also the quality such as the interval between the written servo tracks, such as, whether the servo tracks overlap excessively one another or are too far away from each other, or whether the servo track is eccentric from the center of rotation of the magnetic-recording disk becomes a problem.

Such quality is evaluated by, for example, actually writing data into, or reading data from, the HDD. In this embodiment of the present invention, as data of the yield database shown in FIG. 1, etc., a record is accumulated that indicates whether or not the error rate obtained when data is written, or read, after a predetermined number of tracks have been written into the HDD meets the standards. Then, as an evaluation of a combination of a magnetic-recording head and a magnetic-recording disk, a judgment is made based on whether or not the error rate obtained when data is actually written or read meets the standards.

With reference now to FIG. 14, in accordance with an embodiment of the present invention, an example is shown of data indicating, for each product, the relationship between the part characteristics and the yield of the product testing process 403. The difference from FIG. 12 described in Example 1 is that the product testing yield, not the self-servo write yield, is shown. Here, as described above, the product testing yield is judged based on whether or not the error rate obtained when data is actually written, or read, is met.

For example, data indicating, for each product, the relationship between the part characteristics and the yield of the product testing process 403 indicates that the product testing yield is 0.83 when a product is HDXZ, and satisfies the condition that the read width of a head is 0.5 nm or more but less than 0.6 nm. Moreover, data indicating, for each product, the relationship between the part characteristics and the yield of the product testing process 403 indicates that the product testing yield is 0.81 when a product is HDXZ and satisfies the condition that the part number of a magnetic-recording disk is DK-G-U. The product testing yield is determined by dividing the number of acceptable articles in product testing by the sum of acceptable articles and rejected articles by using the past performance in the previous month, for example, when the characteristics of the position control head and the corresponding magnetic-recording disk satisfy the conditions. In other respects, the process is performed in the same manner as in Example 1.

EXAMPLE 3

In Example 1 and Example 2, data to be stored in the part characteristic database shown in FIG. 1, such as, data on a magnetic-recording head, or alternatively, a magnetic-recording disk, is acquired in the part testing process in FIG. 4. In this embodiment, data on a magnetic-recording head, or alternatively, a magnetic-recording disk, the data to be stored in the part characteristic database in FIG. 1, or data to be stored in the production history database in FIG. 1 is acquired in the self-servo write process.

Figure 21:
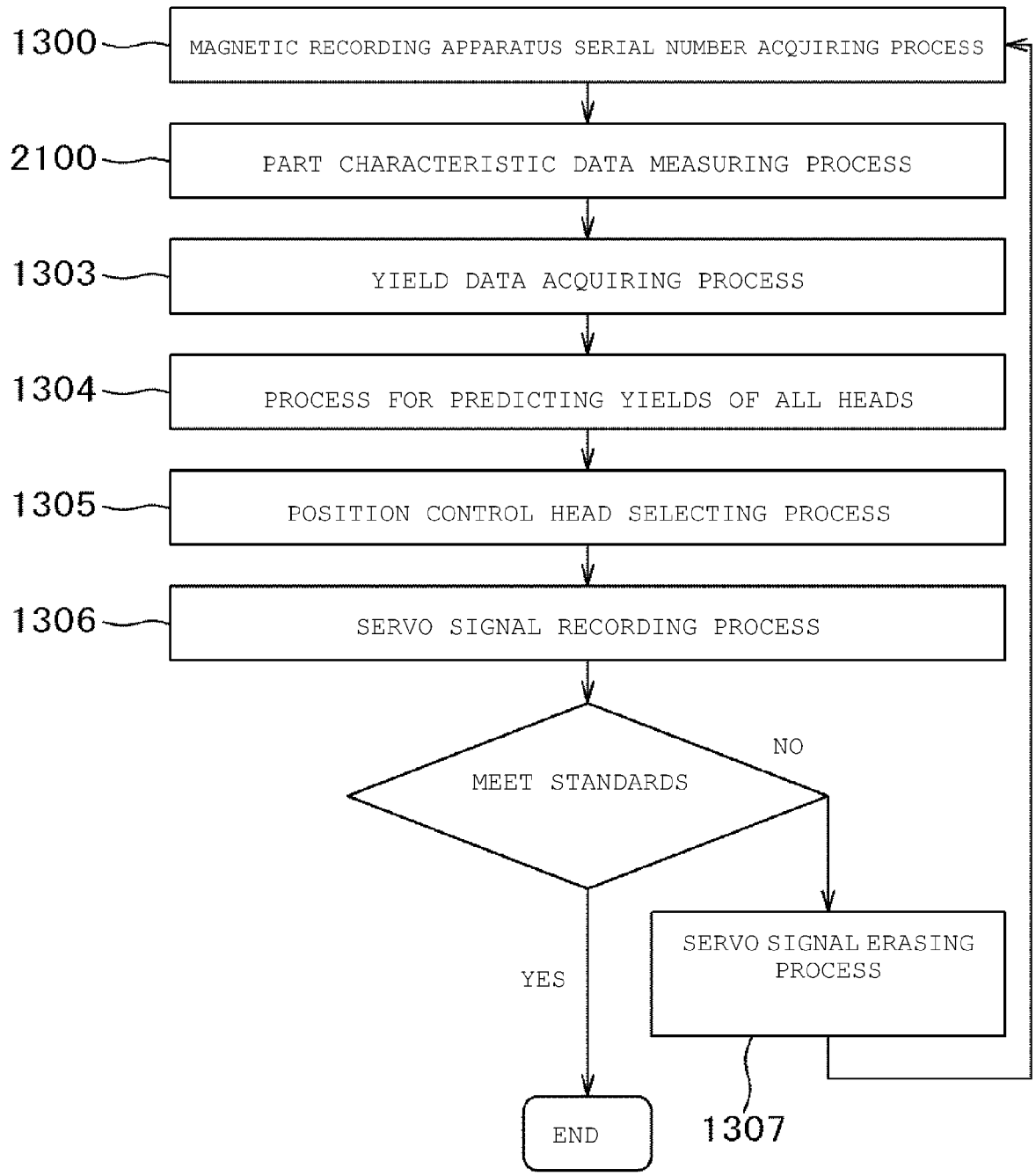
FIG. 21 is another example of a process flow in a self-servo write process, in accordance with an embodiment of the present invention.

With reference now to FIG. 21, in accordance with an embodiment of the present invention, an example is shown of a process flow in the self-servo write process 402. The difference from FIG. 13 described in Example 1 is that a part serial number acquiring process 1301 and a part characteristic data acquiring process 1302 are not provided, and a part characteristic data measuring process 2100 is provided. In the part characteristic data measuring process 2100, the read width of the magnetic-recording head shown in FIG. 5, the write width of the magnetic-recording head shown in FIG. 6, the overwrite strength of the magnetic-recording head shown in FIG. 7, the adjacent track influence quantity of the magnetic-recording head shown in FIG. 8, and the signal amplitude of the magnetic-recording head shown in FIG. 9 are measured by using a self-servo write apparatus. The process that follows is the same as that of Example 1.

Figure 20:
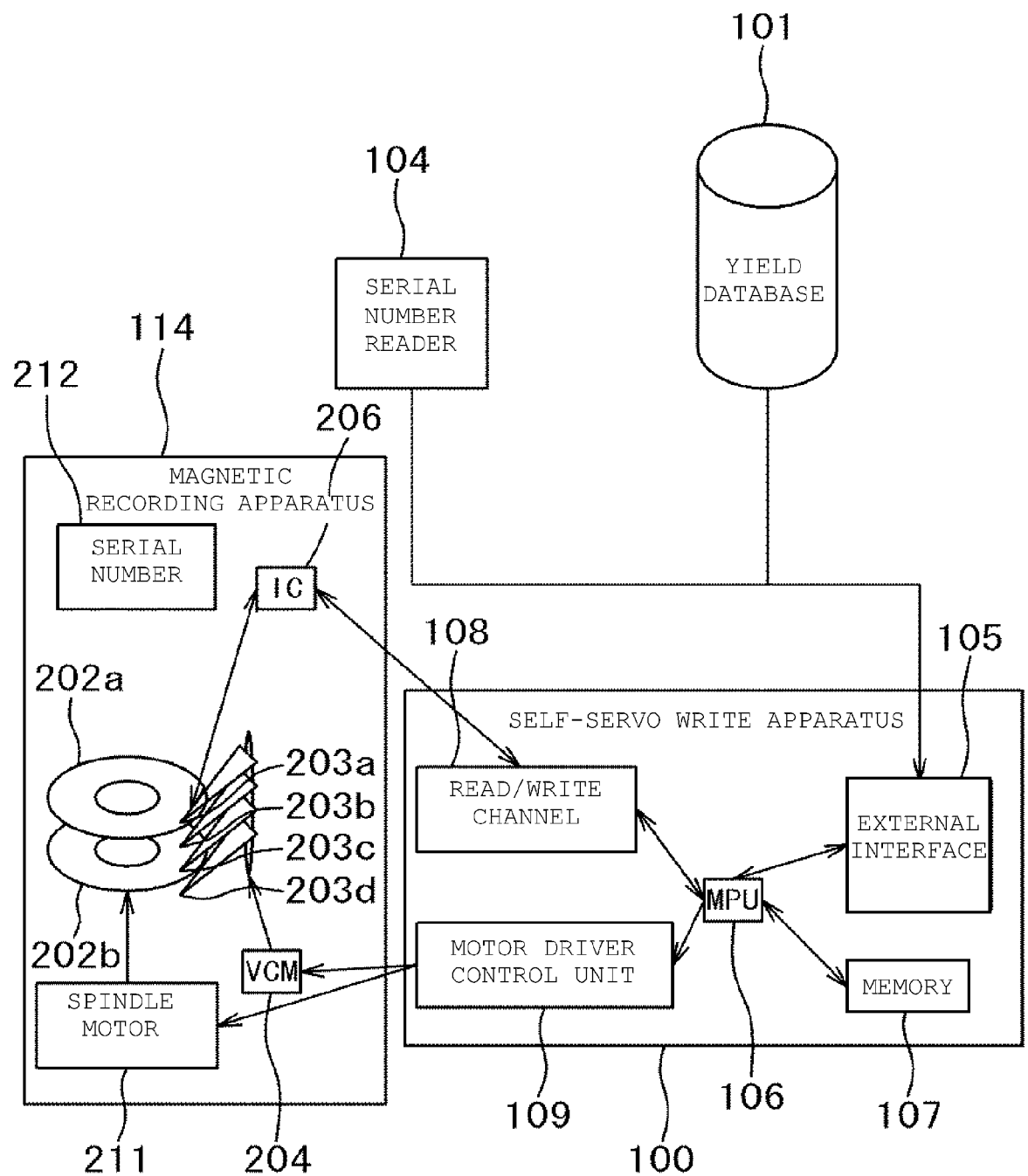
FIG. 20 is another example of a configuration of a self-servo write system, in accordance with an embodiment of the present invention.

With reference now to FIG. 20, in accordance with an embodiment of the present invention, an example is shown in which a HDD to be processed is set in a self-servo write system configuration. The difference from FIG. 1 is that a part characteristic database 102 and a production history database 103 are not provided. In other respects, the example of FIG. 20 is the same as Example 1.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A servo write method for a hard-disk drive, said method comprising:
generating, with an input of characteristics of a magnetic-recording head and a magnetic-recording disk which are incorporated into said hard-disk drive, a yield prediction model from a correlation between yields of said hard-disk drive, and characteristics of said magnetic-recording head and said magnetic-recording disk of said hard-disk drive in a process;
predicting a yield which is obtained when each magnetic-recording head is used as a position control head;
selecting as said position control head a magnetic-recording head that has a highest predicted yield; and
recording a servo signal.

2. The method of claim 1, further comprising:
using as said yield, a ratio of a number of hard-disk drives that can record a predetermined servo signal in a first servo signal writing process of each hard-disk drive to a total number of hard-disk drives subjected to a self-servo write process.

3. The method of claim 1, further comprising:
using as said yield, a ratio of acceptable articles to a sum of acceptable articles and rejected articles in product testing.

4. The method of claim 1, further comprising:
using as said yield prediction model, a model selected from said group consisting of a geometric average of yields for a plurality of part characteristics and a product of yields for a plurality of part characteristics.

5. The method of claim 1, further comprising:
using as said yield prediction model, a model selected from said group consisting of an arithmetic average of yields for a plurality of part characteristics and a total sum of yields for a plurality of part characteristics.

6. A servo write system for a hard-disk drive, said system comprising:
a self-servo write apparatus comprising:
an external interface for connection with a database;
an MPU which controls a said system;
a memory for temporarily retaining data;
a read/write channel which transmits a read signal and receives a write signal; and
a motor driver control unit which controls a spindle motor and a VCM;
a yield database in which data indicating a relationship between a part characteristic and a yield is stored, said yield database being connected to said self-servo write apparatus;
a serial number reader; and
said hard-disk drive comprising:
a plurality of magnetic-recording disks; and
a plurality of magnetic-recording heads corresponding to recording surfaces of said plurality of magnetic-recording disks;
wherein said yield database accumulates a past relationship between characteristics of a magnetic-recording head and a magnetic-recording disk which are incorporated into said hard-disk drive and a yield of said hard-disk drive; said self-servo write apparatus predicts said yield which is obtained when each of all said magnetic-recording heads is used as a position control head in a combination of said plurality of magnetic-recording surfaces and said corresponding magnetic-recording heads; and the self-servo write apparatus selects a magnetic-recording head having a highest predicted yield of said plurality of magnetic-recording heads, and performs a self-servo write.

7. The system of claim 6, wherein a ratio of a number of hard-disk drives that can record a predetermined servo signal in a first servo signal writing process of each hard-disk drive to a total number of hard-disk drives subjected to a self-servo write process is used as said yield.

8. The system of claim 6, wherein a ratio of acceptable articles to a sum of acceptable articles and rejected articles in product testing is used as said yield.

* * * * *